(12) United States Patent
King et al.

(10) Patent No.: US 9,519,705 B2
(45) Date of Patent: Dec. 13, 2016

(54) METHOD AND APPARATUS FOR SELECTING CLUSTERINGS TO CLASSIFY A DATA SET

(75) Inventors: Gary King, Brookline, MA (US); Justin Grimmer, Cambridge, MA (US)

(73) Assignee: PRESIDENT AND FELLOWS OF HARVARD COLLEGE, Cambridge, MA (US)

( * ) Notice: Subject to any disclaimer, the term of this patent is extended or adjusted under 35 U.S.C. 154(b) by 437 days.

(21) Appl. No.: 13/979,196

(22) PCT Filed: Jan. 23, 2012

(86) PCT No.: PCT/US2012/022178
§ 371 (c)(1),
(2), (4) Date: Sep. 10, 2013

(87) PCT Pub. No.: WO2012/102990
PCT Pub. Date: Aug. 2, 2012

(65) Prior Publication Data
US 2014/0006403 A1 Jan. 2, 2014

Related U.S. Application Data

(60) Provisional application No. 61/436,037, filed on Jan. 25, 2011.

(51) Int. Cl.
*G06F 17/30* (2006.01)
*G06K 9/62* (2006.01)

(52) U.S. Cl.
CPC ..... *G06F 17/30705* (2013.01); *G06F 17/3071* (2013.01); *G06K 9/6218* (2013.01)

(58) Field of Classification Search
CPC ........... G06F 17/3071; G06F 17/30705; G06F 17/30333; G06F 17/30536; G06F 3/04815
See application file for complete search history.

(56) References Cited

U.S. PATENT DOCUMENTS 6,574,378 B1 * 6/2003 Lim .............................. 382/305
7,406,200 B1 * 7/2008 Syeda-Mahmood G06K 9/6219
382/225

(Continued)

FOREIGN PATENT DOCUMENTS

WO WO-2010/120684 10/2010

OTHER PUBLICATIONS

Chris Ding; Xiaofeng He, K-means Clustering via Principal Component Analysis, 2004, pp. 1-8.*

(Continued)

*Primary Examiner* — James Trujillo
*Assistant Examiner* — Fatima Mina
(74) *Attorney, Agent, or Firm* — Morgan, Lewis & Bockius LLP

(57) ABSTRACT

In a computer assisted clustering method, a clustering space is generated from fixed basis partitions that embed the entire space of all possible clusterings. A lower dimensional clustering space is fu-reated from the space of all possible clusterings by isometrically embedding the space of all possible clusterings in a lower dimensional Euclidean space. This lower dimensional space is then sampled based on the number of documents in the corpus. Partitions are then developed based on the samples that tessellate the space. Finally, using clusterings representative of these tessellations, a two-dimensional representation for users to explore is created.

20 Claims, 3 Drawing Sheets

(56) References Cited

U.S. PATENT DOCUMENTS

| | | | |
|---|---|---|---|
| 7,728,839 B2* | 6/2010 | Yang | A61B 5/1038 345/474 |
| 2002/0193981 A1 | 12/2002 | Keung et al. | |
| 2004/0151384 A1* | 8/2004 | Yang | G06K 9/00275 382/225 |
| 2006/0182327 A1* | 8/2006 | Mundy | C07D 401/14 382/132 |
| 2008/0215314 A1 | 9/2008 | Spangler | |
| 2008/0313179 A1* | 12/2008 | Trepess et al. | 707/5 |
| 2009/0089438 A1* | 4/2009 | Agarwal et al. | 709/228 |
| 2009/0097733 A1* | 4/2009 | Hero et al. | 382/133 |
| 2010/0131496 A1* | 5/2010 | Strehl et al. | 707/722 |

OTHER PUBLICATIONS

Justin Grimmer and Gray King; General purpose computer-assisted clustering and conceptualization, Dec. 22, 2010.*

International Search Report mailed Jul. 30, 2012 for International Application No. PCT/US2012/022178 (3 pages).

Justin Grimmera, "General Purpose Computer-Assisted Clustering and Conceptualization," PNAS, vol. 108, (http://www.pnas.org/content/) Dec. 22, 2010.

* cited by examiner

METHOD AND APPARATUS FOR SELECTING CLUSTERINGS TO CLASSIFY A DATA SET

RELATED APPLICATIONS

This application is U.S. National Stage Application of PCT/US2012/022178, filed Jan. 23, 2012, which claims priority to and the benefit of U.S. Provisional Patent Application No. 61/436,037, filed Jan. 25, 2011, the disclosures of which are incorporated herein by reference.

BACKGROUND

Most academics and numerous others routinely attempt to discover useful information by reading large quantities of unstructured text. The corpus of text under study may be literature to review, news stories to understand, medical information to decipher, blog posts, comments, product reviews, or emails to sort, audio-to-text summaries of speeches to comprehend. The purpose is to discover useful information from this array of unstructured text. This is a time-consuming task and the information is increasing at a very fast rate, with the quantity of text equivalent to that in Library of Congress being produced in emails alone every ten minutes.

An essential part of information discovery from unstructured text involves some type of classification. However, classifying documents in an optimal way is an extremely challenging computational task that no human being can come close to optimizing by hand. The task involves choosing the "best" (by some definition) among all possible ways of partitioning a set of n objects (which mathematically is known as the Bell number). The task may sound simple, but merely enumerating the possibilities is essentially impossible for even moderate numbers of documents. For example, the number of partitions of a set of merely 100 documents is 4.76e+115, which is considerably larger than the estimated number of elementary particles in the universe. Even if the number of partitions is limited, the number is still far beyond human abilities; for example, the number ways of classifying 100 documents into two categories is 6.33e+29.

In addition, the task of optimal classification involves more than enumeration. Classification typically involves assessing the degree of similarity between each pair of documents, and then creating a set of clusters called a "clustering" by simultaneously maximizing the similarity of documents within each cluster and minimizing the similarity of documents across clusters. For 100 documents, $$\binom{100}{2} = 4,950$$

similarities need to be remembered while sorting documents into categories and simultaneously optimizing across the enormous number of possible clusterings.

This contrasts with a number somewhere between 4 and 7 (or somewhat more, if ordered hierarchically) items a human being can keep in short-term working memory. Various algorithms to simplify this process are still extremely onerous and are likely to lead to sacrificing rather than optimizing. In addition, this process assumes that humans can reliably assess the similarity between documents, which is probably unrealistically optimistic given that the ordering of the categories, the ordering of the documents, and variations in human coder training typically prime human coders to respond in different ways. In practice, inter-coder reliability even for well-trained human coders classifying documents into given categories is rarely very high.

Since a crucial component of human conceptualization involves classifying objects into smaller numbers of easier-to-comprehend categories, an expansive literature in biology, computer science, statistics, and the social sciences has arisen to respond to this challenge. The literature is focused on fully automatic clustering (FAC) algorithms designed to produce insightful partitions of input objects with minimal human input. At least 150 such FAC algorithms have been characterized in the literature. Each of these methods work well in some data sets, but predicting which, if any, method will work well for a given application is often difficult or impossible, and none work well across applications.

Other articles disclose computer assisted clustering (CAC) methods designed to give a human user help in finding an insightful or useful conceptualization from a choice of clusterings. The intended trade-off means that CAC methods require an investment of more user time relative to FAC methods in return for better, more insightful, clusterings. However, CAC methods, in turn, require considerably less user time than completely unassisted human clustering. For example, in an article entitled "A General Purpose Computer-Assisted Document Clustering Methodology." J. Grimmer and G. King, 2010, a disclosed CAC method applies a large set of FAC methods to a data set and scales the resulting clusterings so they are each represented by a point in two-dimensional space, with points closer together representing clusterings that are more similar. These points are then used as basis partitions to construct millions of new clusterings. A method is defined for identifying new clusterings in the two dimensional space, through the creation of local averages of the clusterings from the statistical model. In this way, every point in the space defines a clustering. This space is then graphically displayed and a user can move a cursor around the space and (in an accompanying display window) watch one clustering morph into another. This CAC method was designed to help users quickly and efficiently choose clusterings that they, and others, found more insightful or useful than clusterings created by existing FAC methods or by following traditional approaches without computer assistance.

However, in this CAC method clusterings produced by all existing FAC methods comprise only a small portion of the possible clusterings. Since these clusterings are used to construct the clustering space that can be explored by the user, the aforementioned CAC method inherently limits the clustering space and omits many clusterings.

SUMMARY

Figure 1:
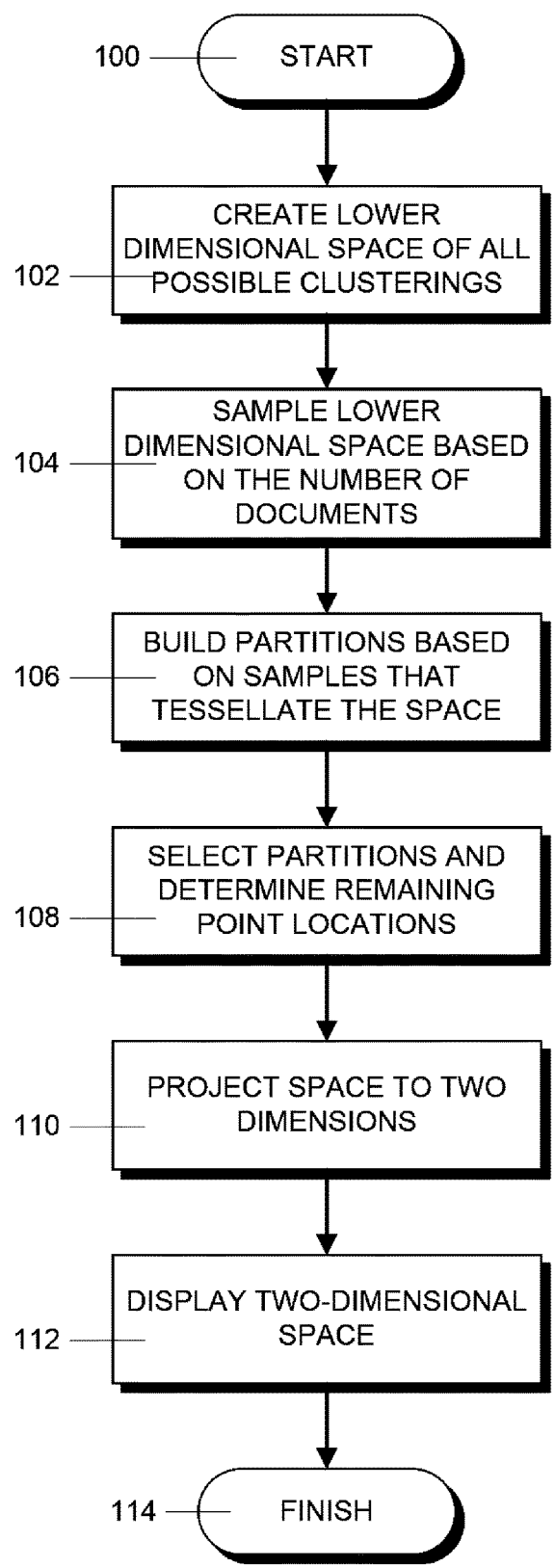
FIGS. 1 and 2 are flowcharts of an exemplary method in accordance with embodiments of the invention.

In accordance with the principles of the invention, in a CAC method, a clustering space is generated from fixed basis partitions that embed the entire space of all possible clusterings. A two-dimensional clustering space is created from the space of all possible clusterings by first isometrically embedding the space of all possible clusterings in a lower dimensional Euclidean space. This lower dimensional space is then sampled based on the number of documents in the corpus. Partitions are then developed based on the samples that tessellate the space. Finally, using clusterings representative of these tessellations, a two-dimensional representation for users to explore is created.

In one embodiment the lower dimensional Euclidean space is sampled randomly.

In another embodiment the lower dimensional Euclidean space is sampled by selecting at least some partitions of interest to a user.

In still another embodiment, partitions are created from the samples by finding a partition, which is approximately the closest partition to each sample. This partition is found by identifying pairs of documents that should be grouped together. The latter step is performed by scoring the pairs and selecting the smallest scores. To ensure that the closest partition is found, coordinates with small scores are sequentially added while maintaining the pairings necessary to ensure that only a single partition is selected.

In a further embodiment, a two dimensional space is created from the partitions employing "landmark" multidimensional scaling. First, a subset of "landmark" points are selected and embedded using a conventional multi-dimensional scaling algorithm. The embedded points are then used to triangulate the location of the remaining points. As a final step, a two-dimensional grid (or lattice) of points equal to the number of clusterings sampled is created and the closest points to each point on the grid are selected, beginning in the upper-left hand corner.

In still another embodiment, an animated visualization method displays the two-dimensional space and allows a user to move around and explore the space of clusterings by displaying the clusters in the clustering at each point in the lower dimensional space and smoothly morphing from a clustering generated by one clustering method to clusterings generated by other clustering methods as different points in the space are selected. The visualization aids a researcher in choosing one or a small number of clusterings that are the most useful or informative about the documents.

DETAILED DESCRIPTION

FAC algorithms require assumptions about identifying the relevant meaning in the text of each document, parsing the text, representing the text quantitatively, measuring the similarity between documents, and evaluating the quality of a cluster and entire clusterings, among others. The application of an FAC method making these assumptions, along with additional assumptions for estimation, produces the automatic identification of a single clustering. When, as is often the case, this clustering is not sufficiently useful, some small amount of human intervention may be applied by tweaking the tuning parameters that come with some FAC methods; however, differences among clusterings from any one FAC method tends to be very small and, for example, far smaller than differences across methods. For CAC methods, the meaning in unstructured text need not be identified by parsing algorithms and the text need not be represented quantitatively. The other assumptions required for FAC algorithms are also not required. Instead, CAC methods make assumptions about the space of possible clusterings and how human beings can interact with and learn from it.

Figure 2:
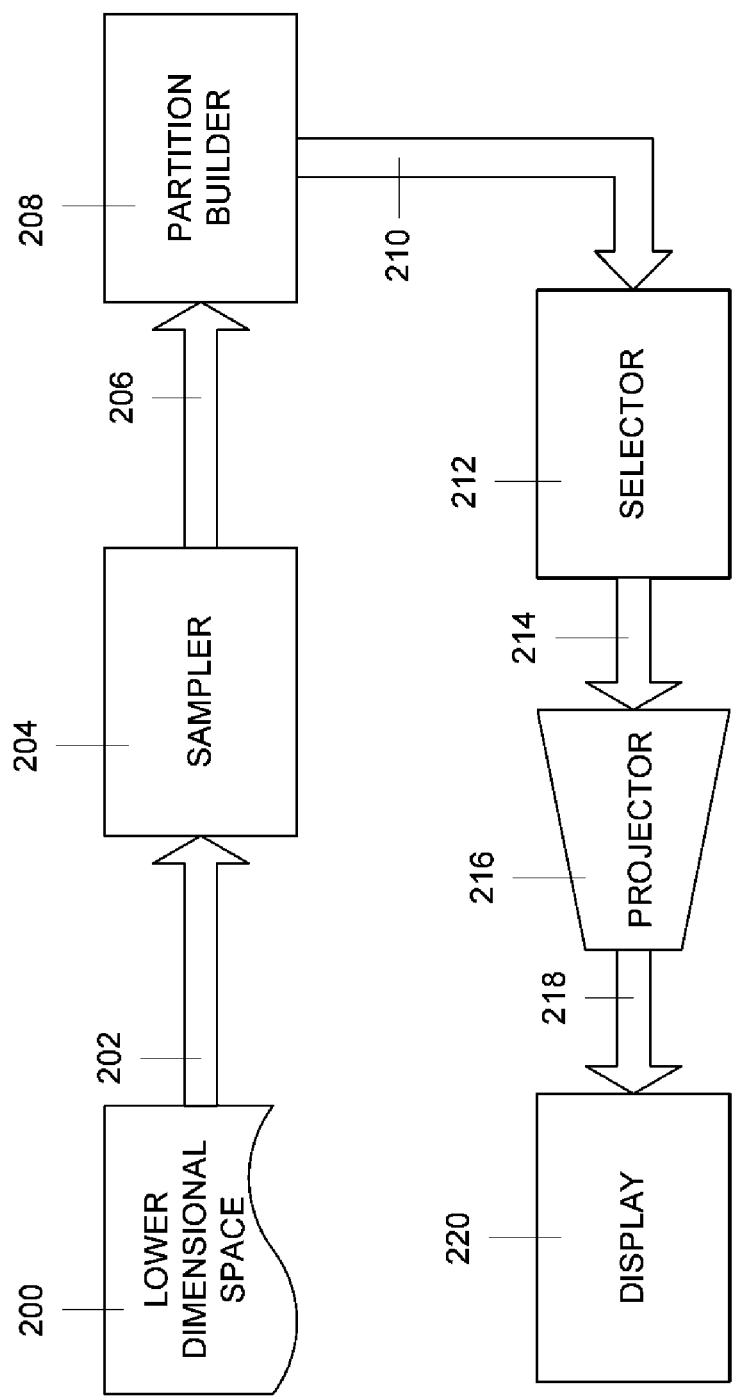

An illustrative embodiment of the inventive method is disclosed in FIGS. 1 and 2. The process begins in step 100 and proceeds to step 102 where a Euclidean space 200 of all possible clusterings is created. The first step in this creation is to characterize the space of all clusterings. Let N be the number of objects (which may be text or other documents), and P be one possible partition of the objects into mutually exclusive and exhaustive nonempty subsets. The partition is also called a "clustering", and the subsets within the partition are also called "clusters". The number of unique partitions P in a set of N objects is known as the "Bell number". Although the Bell number for two documents is two (both in the same cluster or each in separate clusters), and for three documents is five, it increases very fast thereafter. For example, the number of partitions of a set of 100 documents is 4.76e+115, and most clustering problems have many more documents. Even if the number of partitions is fixed, the number is still huge; for example, the number ways of classifying 100 documents into 2 categories is 6.33e+29.

The Bell space is defined as the set of all possible unique partitions $P_N$ of N objects. Although the Bell space is immense, it is only $$\binom{N}{2} -$$

dimensional and therefore can be embedded in an $$\binom{N}{2} -$$

dimensional Euclidean space. The key to this representation is recognizing that each partition (or clustering) can be uniquely characterized by the set of pairs of documents where both members of each pair appear in the same cluster. This suggests that a smaller set of $$\binom{N}{2}$$

total partitions can be used to build a set of local cluster ensembles that describe the entire Bell space and can be used to embed the Bell space into the Euclidean space.

Building a local cluster ensemble requires five pieces of information. First is a distance metric. Second is a set of "basis" partitions in the Euclidean space. Third is a kernel density to determine the weight placed on each of the basis partitions to construct a specific clustering at a point in the space. Fourth is a rule for combining the weighted average of the basis partitions to create a similarity matrix. And finally, a "cluster function" is required to map from the similarity matrix to the space of partitions.

An illustrative distance metric is defined for N observations and two arbitrary partitions of these observations, $P_x$ and $P_y$. Assuming partition $P_x$ groups together x total pairs of observations into the same partition while $P_y$ groups together y total pairs and that $P_x$ and $P_y$ share $C_{x,y} \leq \min(x, y)$ pairs of observations that both partitions $P_x$ and $P_y$ agree belong in the same cluster. In this case the distance on the partitions $D(P_y, P_y)$ is defined as $$D(P_x, P_y) = \left(\frac{x + y - 2c_{x,y}}{xy}\right)^{\frac{1}{2}}$$

Illustrative basis partitions are the set of observations that place a single pair of observations into the same cluster; each partition is represented as $B_{i,j}$. The basis partitions are placed at the corners of an $$\binom{N}{2}$$

dimensional simplex, each with coordinate $e_{i,j}$.

An illustrative kernel, k, used to determine the weight on each basis partition is given by $k(z)=1$ for all $z\epsilon[0,1]$ $k(z)=0$ otherwise An illustrative weight placed on each partition located around a point c in the simplex is $w_{i,j}=k(d(c, e_{i,j}))$ where the distance d between any two points x, y in K dimensional Euclidean space is $d(x,y)=\sqrt{\Sigma_{k=1}^{k}(x_k-y_k)^2}$. With this weighting, an illustrative similarity matrix can be constructed as $S_c=\sqrt{\Sigma_{i<j}\Sigma_{j=2}^{N}w_{i,j}B_{i,j}}$.

Finally, any clustering method f that identically returns partitions can be used to map from the similarity matrix to the space of partitions.

This procedure does not explicitly embed all the points in the Bell space. To do so would quickly exhaust the memory of the largest supercomputers for even moderately sized data sets. Naively searching through the space is possible using the geometry created above, but the space can be more effectively explored by examining systematically selected subsets of the space (or imposing additional assumptions). In particular, a set of p partitions is chosen from the Bell space and organized into a two-dimensional space with points near each other representing clusterings that are more similar. The number of partitions p should equal the number of pixels available to display the space, although a user could zoom in at any point to present additional partitions. Most of the displayed partitions should represent areas of the Bell space that are perceptually distinguishable so that the bulk of the diversity of relevant clusterings is offered to the user.

In accordance with the principles of the invention, in step 104, the Bell space is sampled by sampler 204 based on the number of documents in the corpus as indicated schematically by arrow 202. These samples are provided to the partition builder 208 as indicated schematically by arrow 206. In step 106, partitions that tessellate the entire space for this number of documents are generated by the partition builder 208. It can be shown that the Bell space of partitions lies on a set of hyperspheres inside the simplex that are of decreasing radius towards the center of the simplex. Therefore, it is sufficient to tessellate each of these hyperspheres individually in order to tessellate the entire Bell space. In order to do this, a set of random samples is draw from each hypersphere. The closest partition to each of the samples on the sphere is then found. Because the union of the hyperspheres constitutes the Bell space, the union of the hypersphere tessellations constitutes a tessellation of the Bell space.

The partition builder 208 proceeds as follows. Specifically, assume that a hypersphere, which contains the set of partitions that group together k observations, is to be tessellated. This implies that the hypersphere corresponding to k observations has a radius of $$r = \sqrt{\left(\frac{1}{k} - \frac{1}{\binom{N}{2}}\right)}.$$

To take a random draw from this hypersphere, first, draw a point $$x \sim N_{\binom{N}{2}}(d, c \times I)$$

where c and d are composed of arbitrary constants. This point is then projected to the unit sphere by calculating $$x_s = \frac{1}{s}x,$$

where $$S = \sqrt{x_1^2 + x_2^2 + \ldots + x_{\binom{N}{2}}}$$

Finally, the sphere is resized and moved to the center of the hypersphere, $$x_k = x_s \times r + \frac{1}{\binom{N}{2}}.$$

Repeatedly drawing these points will produce a set of samples uniformly distributed over the unit-hypersphere. These draws now constitute a uniform sample over the hypersphere, but are not a set of partitions that tessellate the hypersphere. To tessellate with partitions, the partitions closest to each of the random point draws are found. Identifying a closest partition naively is an NP-hard problem, but an approximate method can be used. Partitions with k pairs will be at a point that is comprised of k 1/k elements and $$\binom{N}{2} - k$$

0 elements. Each coordinate $x_z$ is either $$\left(x_z - \frac{1^2}{k}\right)$$

or $x_z^2$ from its new location in the partition. Therefore, to identify pairs that should be grouped together, the pairs are scored by $$\left(x_z - \frac{1}{k}\right)^2 - x_z^2.$$

The closet partition can be identified by taking the k smallest scores. To ensure that the closest partition is identified, coordinates with small scores are sequentially added. However, as new pairs of observations are added, the pairings necessary to ensure that only a single partition is selected are maintained. The result of this algorithm is a set of partitions that are evenly distributed over the hypersphere. Joining together the partitions that tessellate this hypersphere therefore constitutes a probabilistic tessellation of the entire Bell space.

The fact that the tessellation is constructed by the individual concentric hyperspheres turns out to be very convenient for the many applications where researchers have some prior notion about the types of clusterings that would prove most insightful. Small regions of the hyperspheres contain partitions that group together the same number of clusters and have similar entropy. By sampling from the regions of hyperspheres with partitions of interest it can be much easier for a researcher to identify a clustering of interest from the two-dimensional space to be explored. Using this sampling scheme also makes it easy to only include partitions where a given set of pairs of documents are together or a different given set are grouped separately.

The next step in the inventive method is a projection of the space to two dimensions to facilitate exploration. Because large numbers of partitions will be sampled, it is infeasible to directly perform embedding using direct approaches, such as conventional multidimensional scaling algorithms. The direct application of these algorithms requires the computation and storage of a distance matrix that compares the distance of each pair of observations. This would require an immense amount of memory just to store the distance matrix, let alone the processing power to naively apply the algorithms to the distance matrix.

One alternative strategy, shown in step 108, is to employ landmark multidimensional scaling. This method, and the broader class of methods known as Nystrom methods, proceed in two steps. First a subset of points is selected that constitute the "landmarks". An embedding is performed on this subset, and then that embedding is used to triangulate the location of the remaining points. This procedure substantially reduces the computational complexity of the embedding at the cost of a departure from an optimal solution that a classic multidimensional scaling algorithm might identify.

In one embodiment, a specific Nystrom algorithm employed proceeds in a series of steps introduced in an article entitled. "Global Versus Local Methods in Nonlinearity Dimensionality Reduction", V. de Silva and J. B. Tenenbaum, *Proceedings of Neural Information Processing Systems* 15:721-728 (2003), which article is incorporated herein in its entirety by reference. The sampled partitions are received form by the selector 212 from the partition builder 208 as schematically indicated by arrow 210. The sampler 212 randomly selects a subset of the sampled partitions, along with the basis partitions. A sub-distance matrix is then computed for this set of partitions and either a Sammon multi-dimensional scaling (as described in "A Nonlinear Mapping for Data Structure Analysis". J. Sammon, *IEEE Transactions on Computers* 18(5):401-409 (1969), which article is hereby incorporated herein in its entirety) or a classic multi-dimensional scaling is performed to embed the points. For the remaining points, a triangulation method is used that places the points in the space based on their distance from the randomly selected points.

The points are then transferred to the projector 216 as indicated by arrow 214, where, in step 110, a greedy method is used to embed the points in a two-dimensional lattice. First a grid (or lattice) of points equal to the number of clusterings sampled is created. The closest points to each point on the grid are then greedily selected, beginning in the upper-left hand corner of the grid. While this process severely deforms the space (even more so than the landmark embedding), this provides the users a space that is easier to navigate.

The final step 112 in the inventive method is to provide a map or a geography of clusterings, with nearby clusterings being more similar. This geography organizes results and enables a researcher to choose efficiently one or a small number of clusterings which convey the most useful information, or which meet any other criteria the researcher imposes.

The points generated by the projector 216 are transferred to the display 220 as indicated by 218. A map is generated by displaying the two-dimensional projection of the clusterings as separate points on a display screen. Each point in the space corresponds to one clustering. Some discrete points may be labeled to give structure to the space. For example, clusterings produced by methods that have come out of prior research may be labeled with the name of the clustering method used to generate them. Other points in this space correspond to new clusterings constructed with a local cluster ensemble. The space is formally discrete, since the smallest difference between two clusterings occurs when (for non-fuzzy clustering) exactly one document moves from one cluster to another.

The display is arranged so that a researcher can move a cursor over the space of clusterings and select a single point. When the point is selected, the corresponding clusters in the clustering for that point appear in a separate window. The researcher can then drag the selected point in any direction and watch the clusters in the separate window morph smoothly from clusters in one clustering to clusters in the adjacent clustering. The process then finishes in step 114.

Figure 3:
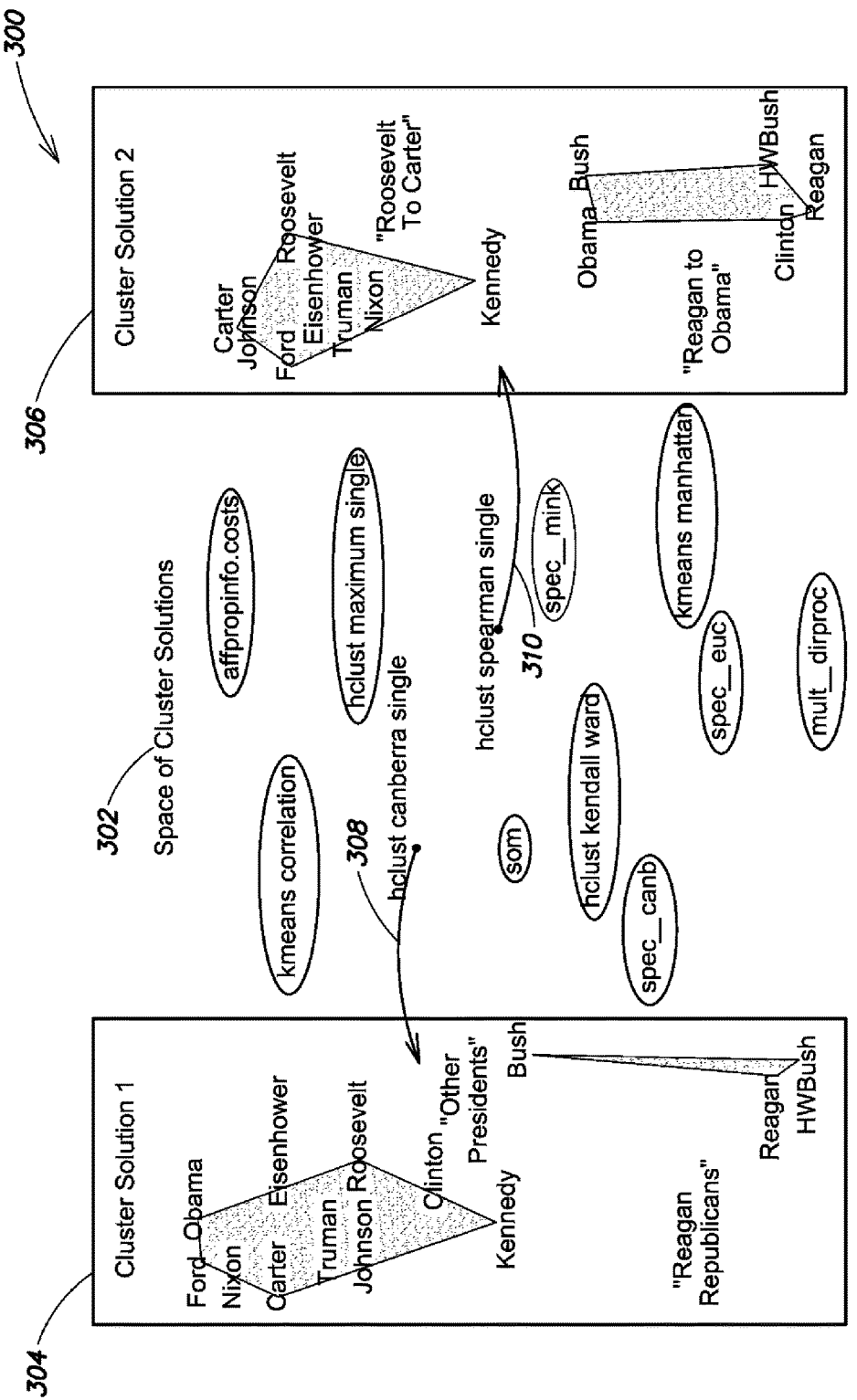
FIG. 3 is an illustration of a visualization of a space of clusterings in accordance with embodiments of the invention.

FIG. 3 illustrates one inventive visualization 300 of a space of clusterings, when applied to one simple corpus of documents. In this illustrative example, the initial data set includes the biographies of each U.S. president from Roosevelt to Obama; the biographies were downloaded from the White House website.

The two-dimensional projection of the space of clusterings is illustrated in the central panel 302, with individual clustering methods labeled. Each clustering method corresponds to one point in this space, and one clustering of the given documents. The space is formally discrete, since the smallest difference between two clusterings occurs when (for non-fuzzy clustering) exactly one document moves from one cluster to another, but an enormous range of possible clusterings still exists: even this tiny data set of only 13 documents can be partitioned in 27,644,437 possible ways, each representing a different point in this space. In order to reduce the complexity of the diagram only some points have been labeled. The labeled points correspond to clustering methods that have been used in prior research on text documents; other points in this space correspond to new clusterings, each clustering constructed as a local cluster ensemble.

Two specific clusterings 304 and 306, each corresponding to one point as indicated by arrows 308 and 310, respectively, in the central space appear to the left and right of the figure. In these clusterings, labels have been added manually for clarification. Clustering 1 (304), creates clusters of "Reagan Republicans" (Reagan and the two Bushes) and all others. Clustering 2 (306) groups the presidents into two clusters organized chronologically.

Although only two clusters have been shown for clarity, the display is arranged so that a researcher can move a cursor over the space of clusterings and select a single point. When the point is selected, the corresponding clusters in the clustering for that point appear in a separate window. The researcher can then drag the selected point in any direction and watch the clusters in the separate window morph smoothly from clusters in one clustering to clusters in the adjacent clustering.

While the invention has been shown and described with reference to a number of embodiments thereof, it will be recognized by those skilled in the art that various changes in form and detail may be made herein without departing from the spirit and scope of the invention as defined by the appended claims.

What is claimed is:

1. A method for selecting clusterings to classify a data set, the method implemented in a data processor having a memory and a display and comprising:
   a) using the data processor to create a lower dimensional space of all possible clusterings and storing the space in the memory, each clustering being associated with an allocation of objects to be clustered and corresponding to a point in the lower dimensional space;
   b) using the data processor to sample the stored lower dimensional space based on a number of objects in the data set;
   c) using the data processor to build partitions based on the samples that tessellate the lower-dimensional space of all possible clusterings, the clusterings being tessellated based on similarities among the objects in the associated allocations;
   d) using the data processor to select partitions and determine remaining point locations in the lower dimensional space;
   e) using the data processor to project the points of the lower dimensional space to a two dimensional array of points; and
   f) displaying, on the display, points in the two-dimensional array.

2. The method of claim 1 wherein step (a) comprises using the data processor to embed a space of all possible clusterings into a lower dimensional Euclidean space.

3. The method of claim 2 wherein step (b) comprises using the data processor to randomly sample the lower dimensional Euclidean space.

4. The method of claim 2 wherein step (b) comprises using the data processor to sample the lower dimensional Euclidean space by selecting at least some partitions of interest to a user.

5. The method of claim 1 wherein step (c) comprises using the data processor to find a partition that is approximately the closest partition to each sample generated in step (b).

6. The method of claim 5 wherein the objects are documents and step (c) comprises using the data processor to score pairs of documents and to select the smallest scores.

7. The method of claim 6 further comprising using the data processor to sequentially add coordinates with small scores while maintaining pairings necessary to ensure that only a single partition is selected.

8. The method of claim 1 wherein step (d) comprises using the processor to select a subset of "landmark" points, to embed the selected points using a conventional multi-dimensional scaling algorithm and, using the embedded points, to triangulate the location of the remaining points.

9. The method of claim 1 wherein step (e) comprises using the data processor to create a two-dimensional grid of points equal to the number of clusterings sampled and to select the closest points to each point on the grid.

10. The method of claim 1 wherein the data processor has a mechanism for selecting a point on the display and step (e) comprises displaying clusters in a clustering corresponding to the selected point.

11. Apparatus for selecting clusterings to classify a data set comprising a data processor having a display and a memory with a software program therein that controls the data processor to perform the following steps:
   a) creating a lower dimensional space of all possible clusterings and storing the space in the memory, each clustering being associated with an allocation of objects to be clustered and corresponding to a point in the lower dimensional space;
   b) sampling the stored lower dimensional space based on a number of objects in the data set;
   c) building partitions based on the samples that tessellate the lower-dimensional space of all possible clusterings, the clusterings being tessellated based on similarities among the objects in the associated allocations;
   d) selecting partitions and determine remaining point locations in the lower dimensional space;
   e) projecting the points of the lower dimensional space to a two-dimensional array of points; and
   f) displaying, on the display, points in the two-dimensional array.

12. The apparatus of claim 11 wherein step (a) comprises embedding a space of all possible clusterings into a lower dimensional Euclidean space.

13. The apparatus of claim 12 wherein step (b) comprises randomly sampling the lower dimensional Euclidean space.

14. The apparatus of claim 12 wherein step (b) comprises sampling the lower dimensional Euclidean space by selecting at least some partitions of interest to a user.

15. The apparatus of claim 11 wherein step (c) comprises finding a partition that is approximately the closest partition to each sample generated in step (b).

16. The apparatus of claim 15 wherein the objects are documents and step (c) comprises using the data processor to score pairs of documents and to select the smallest scores.

17. The apparatus of claim 16 further comprising sequentially adding coordinates with small scores while maintaining pairings necessary to ensure that only a single partition is selected.

18. The apparatus of claim 11 wherein step (d) comprises selecting a subset of "landmark" points, embedding the selected points using a conventional multi-dimensional scaling algorithm and, using the embedded points, to triangulate the location of the remaining points.

19. The apparatus of claim 11 wherein step (e) comprises creating a two-dimensional grid of points equal to the number of clusterings sampled and selecting the closest points to each point on the grid.

20. The apparatus of claim 11 wherein the data processor has a mechanism for selecting a point on the display and step (e) comprises displaying clusters in a clustering corresponding to the selected point.

* * * * *

UNITED STATES PATENT AND TRADEMARK OFFICE
CERTIFICATE OF CORRECTION

PATENT NO.         : 9,519,705 B2
APPLICATION NO.    : 13/979196
DATED              : December 13, 2016
INVENTOR(S)        : Gary King et al.

Page 1 of 1

It is certified that error appears in the above-identified patent and that said Letters Patent is hereby corrected as shown below:

On the Title Page

Item (57), at Abstract, Line number 4, "space is fu-reated from" should read -- space is created from --

In the Specification

At Column 5, Line number 23, " $S_c = \sqrt{\Sigma_{i<j} \Sigma_{j=2}^{N} W_{i,j} B_{i,j}}$ " should read -- $S_c = \Sigma_{i<j} \Sigma_{j=2}^{N} W_{i,j} B_{i,j}$ --

Signed and Sealed this
Thirteenth Day of June, 2017

Joseph Matal
*Performing the Functions and Duties of the*
*Under Secretary of Commerce for Intellectual Property and*
*Director of the United States Patent and Trademark Office*